J. D. WRIGHT.
CAR FENDER.
APPLICATION FILED JUNE 19, 1909.

942,027.

Patented Nov. 30, 1909.
2 SHEETS—SHEET 1.

WITNESSES
James F. Duhamel
W.S. McDowell

INVENTOR,
James D. Wright.
BY
Victor J. Evans
ATTORNEYS

J. D. WRIGHT.
CAR FENDER.
APPLICATION FILED JUNE 19, 1909.

942,027.

Patented Nov. 30, 1909.
2 SHEETS—SHEET 2.

WITNESSES
James F. Duhamel
W.S. McDowell

INVENTOR,
James D. Wright,
BY
Victor J. Evans
ATTORNEYS

UNITED STATES PATENT OFFICE.

JAMES D. WRIGHT, OF BROOKLYN, NEW YORK, ASSIGNOR OF ONE-HALF TO LEMUEL S. CLARK, OF BROOKLYN, NEW YORK.

CAR-FENDER.

942,027. Specification of Letters Patent. Patented Nov. 30, 1909.

Application filed June 19, 1909. Serial No. 503,136.

*To all whom it may concern:*

Be it known that I, JAMES D. WRIGHT, a citizen of the United States, residing at Brooklyn, in the county of Kings and State of New York, have invented new and useful Improvements in Car-Fenders, of which the following is a specification.

This invention relates to car fenders and as the result of extensive and persistent experimenting is an improvement on my Patent No. 909,730 of January 12, 1909.

Figures 1, 2:
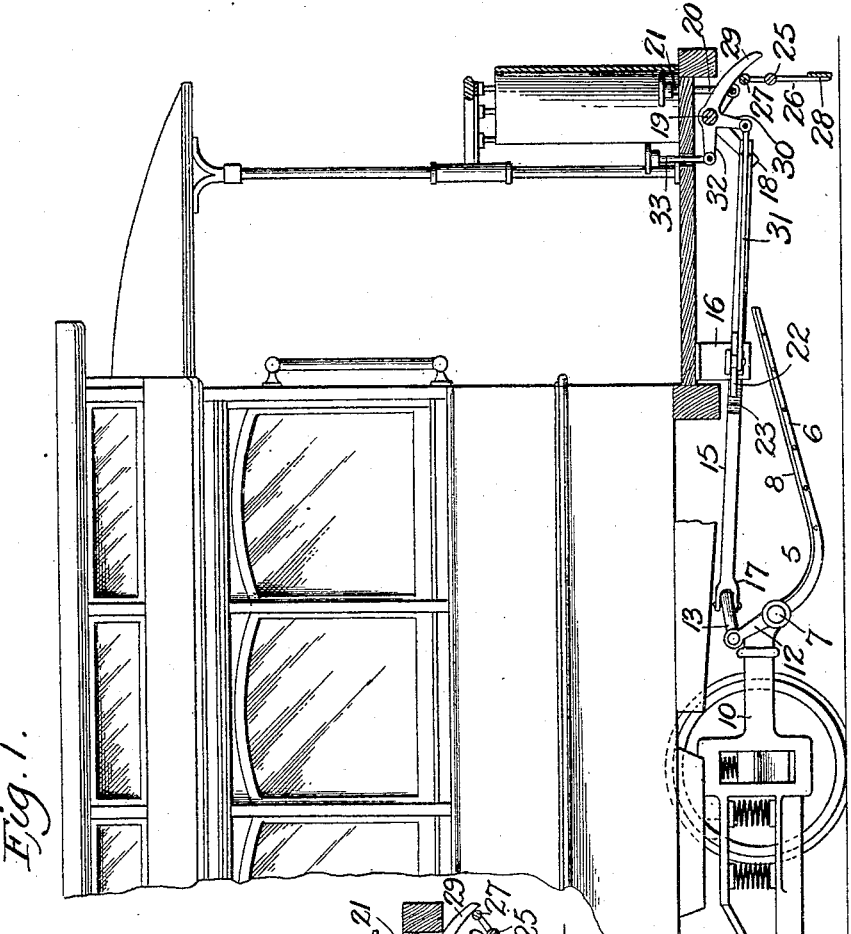
Figure 3:
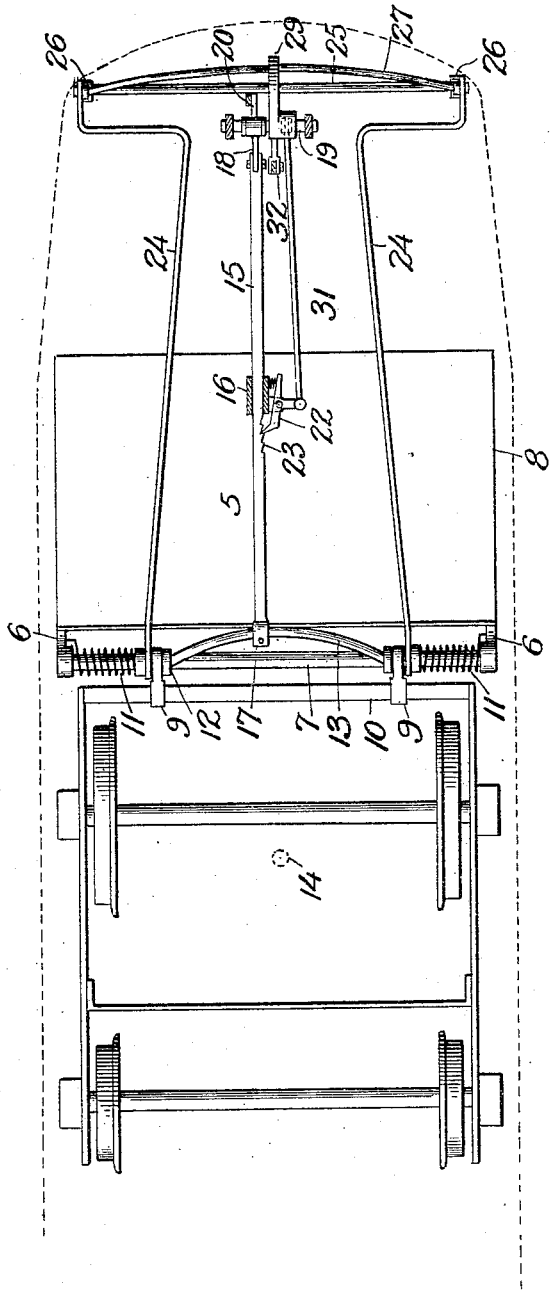

In the present application the fender is hinged to the wheel truck and normally held up under the platform of the car by a latch controlled by a trip bar carried in advance of the fender which when struck by some object on the track releases said fender to prevent the object being run over by the wheels. Means are also provided to elevate and release the fender manually from the platform of the car. These and other objects and details of the invention are more fully explained in the following specification, set forth in the claims and illustrated in the accompanying drawings, where:

Figure 1 is a side elevation of one end of a car with the platform in section and showing the improved fender and its operating mechanism. Fig. 2 shows the fender released. Fig. 3 is a plan view of the car truck and fender with operating mechanism.

The great majority of car fenders have been failures because they have been attached directly to the body of the car and when on a curve are carried far beyond the tracks leaving them exposed and giving no protection to a person accidentally on the track and exposing him to the dangers of the wheels of the car. The extent to which a car body leaves the track, projecting beyond same, while rounding a curve is considerable and the large majority of accidents are liable to happen on curves because they are generally at street corners where the crossings are located and where many people are apt to be on the track. Another failure in the average fender is that reliance is placed upon the motorman entirely to drop same, if it is of the elevated type, but in consequence of his other duties or from inattention or distraction he may not see the party in danger and the fender proves of no use at all. A fender permanently located at a certain distance above the track to catch a human being is very soon beaten out of shape and destroyed by bricks and stones carelessly left on the track. To overcome these objections the present invention embraces a fender hinged to the front of the truck and closely following the track directly in front of the wheels it is held away from the surface of the ground until automatically released by a cheap and simple bar carried at a short distance above the ground and far enough above same to engage any object which the fender is expected to protect from the wheels and finally it may be directly under the control of the motorman who can also drop the fender or return it to its elevated position.

The fender 5 is made up of the arms 6 joined by cross rods and a shaft 7 and covered with sheet metal 8 on its upper side. The shaft 7 is loosely carried in bearings 9 projecting from the truck 10, so that the fender may freely rise and fall, and equalizing springs 11 surround the outer ends of the shaft and are attached to the fender and the adjacent parts of the bearings 9.

The shaft 7 is provided with upwardly projecting arms 12 carrying at their upper ends a rod 13 which is an arc of a circle whose center is the pivot 14 of the truck 10. The fender is supported in its elevated position by this rod and a bar 15 playing in a bracket 16 depending from the platform and having a fork 17 through which the rod 13 plays when the truck and the platform change their relative position. The bar 15 also has a fork at its front end where it is connected with one arm of a bell crank lever 18 loosely carried by a short shaft 19 hung from the lower side of the platform, the other arm being attached to a plunger 20 that passes upward through the platform and has a head 21 by which means the motorman may depress it, thrusting the bar 15 rearwardly against the rod 13 and elevating the fender in which position it is held by a pawl 22 which engages teeth 23 in one side of the bar. Projecting forwardly from the bearings 9 and rigidly secured thereto are arms 24 that extend to the front end of the platform and in which are journaled at that point a rod 25 with vertical arms 26 to carry a curved rod 27 and at their lower ends a contact bar 28, the latter being adapted to rock the frame comprising the arms 26, the two rods 25 and 27 and the bar when it strikes an object and to throw the rod 27 forward. The shaft 19 also carries a three-armed lever, one of the arms 29 bearing upon the front side of rod 27, so that when the latter is tipped forward it throws the arms 29 upward and forward oscillating the lower arm 30 which draws upon a rod 31 connected with the pawl 22 and disengages it from the teeth 23 allowing the fender to fall. A third integral arm 32 has a vertically moving plunger 33 extending through the platform and carrying a head to be pressed down by the motorman when he wants to release the fender.

The parts of this device are few and substantial and may be assembled and attached to the truck by means of the bearing brackets 9 with little trouble. The construction of a fender with a sheet metal covering makes it of sufficient solidity and strength to withstand the hard usage these fenders are supposed to encounter.

It is obvious that the parts may be otherwise arranged or constructed without departing from the essential features above described.

Instead of operating the plunger 20 by means of the foot it may be extended upward and operated by hand through the medium of a screw or lever as desired.

What I claim as new and desire to secure by Letters Patent is:

1. In a car fender, the combination with a car truck, of a fender carried thereby, a rod with teeth above the fender, a longitudinally moving bar operating in the teeth and against the rod, means for locking the bar and means for releasing the bar.

2. In a car fender, the combination with a car truck, of a fender hinged thereto, a curved rod at upper part of the fender, a bar with teeth and engaging the curved rod to retain the fender in its elevated position, a pawl carried by a rod engaging the teeth to lock the bar and automatic means for releasing the pawl.

3. In a car fender, the combination with a car truck, of a hinged fender, a rod concentric with the pivot of the truck and connected with the fender, a longitudinally moving bar with teeth and having a fork in one end to engage the concentric rod, a pawl engaging the teeth, an arm connected with the pawl by a rod, and means for automatically operating the arm to disengage the pawl.

4. In a car fender, the combination with a car truck, of a fender hinged to same, a bar connected with the fender to hold it up and having teeth, a pawl engaging the teeth, a pivoted arm connected with the pawl, a pivoted frame adapted to be struck by an object ahead of the car and move the arm.

5. In a car fender, the combination with a car truck, of forwardly extending arms, a pivoted frame, a fender and cross rods hinged to the truck, a reciprocating bar beneath the car adapted to hold the fender in its elevated position, a pawl locking the bar, an arm connected with the pawl by a rod and locked by the pivoted frame and means for elevating the fender.

6. In a car fender, the combination with a car and truck of a fender hinged to the truck, a curved bar above the fender, a reciprocating bar engaging the curved bar, a bell crank lever with an arm connected with the reciprocating bar, a plunger connected to the other arm of the bell crank lever to elevate the fender, a pawl engaging teeth on the reciprocating lever, a pivoted frame carried by arms projecting from the truck, rocking arms operated by the frame and disengaging the pawl and a plunger connected with the rocking arms to operate the pawl manually.

In testimony whereof I affix my signature in presence of two witnesses.

JAMES D. WRIGHT.

Witnesses:
   CHARLES E. POLLARD,
   WILLIAM RILEY.